UNITED STATES PATENT OFFICE.

AMERICAN NICKEL-PLATING COMPANY, (ASSIGNEE OF ISAAC ADAMS, JR.,) OF NEW YORK, N. Y.

IMPROVEMENT IN COATING METALS WITH METAL.

Specification forming part of Letters Patent No. 57,271, dated August 21, 1866; reissue No. 6,313, dated March 2, 1875; application filed May 3, 1869.

*To all whom it may concern:*

Be it known that ISAAC ADAMS, Jr., of Boston, county of Suffolk and State of Massachusetts, has invented certain Improvements in Coating Metals with Metal; and we, the AMERICAN NICKEL-PLATING COMPANY, of the city, county, and State of New York, (the assignees of said ISAAC ADAMS, Jr.,) by our president, duly authorized, do hereby declare the following to be a full, clear, and exact description thereof.

This invention relates to surfacing metal articles which are to be subjected to flame or moisture, and which by the action of flame or moisture become corroded, with a coating or deposit of anti-corrosive metal, which will practically prevent the oxidizing action of heat and the corrosion from moisture.

The primary object of this invention was the protection of gas tips or burners from oxidation, but it is equally applicable to all articles of metal, without regard to size or purpose, when it is desirable to protect them from oxidation or corrosion.

It is well known that the action of the flame upon common gas-burners soon impairs their orifices by oxidation and the deposit of oxide upon the surfaces against which the flame acts, and it has been practically demonstrated by the patentee of this invention that by coating such surfaces with a thin deposit of nickel the heat and flame have no detrimental effect upon the tips, the orifices being kept entirely free from deposit of oxide, the result being that the flame burns with undiminished luster.

Other metallic articles subjected to heat may be thus treated with similar beneficial results.

The corrosion of the surfaces of metal articles is also effected by moisture, as has been stated, but the coating of nickel is a practical protection against corrosion, whether induced by heat or by moisture, or by both.

From the cheapness and ease of application of nickel by electroplating or otherwise, and the protection which the coating imparts, it will be obvious that this invention is of great practical utility. This invention consists, therefore, in coating or surfacing gas-tips and other articles and implements with a deposit of nickel, to render them anti-corrosive by heat or moisture, or in such articles so coated.

What we claim, therefore, as the invention of the said ISAAC ADAMS, Jr., and desire to secure by Letters Patent, is—

Rendering gas-tips and other articles of metal anti-corrosive to heat or moisture by surfacing them with nickel, substantially as set forth.

In testimony whereof the AMERICAN NICKEL-PLATING COMPANY have affixed their signature, by their president, in presence of two subscribing witnesses.

AMERICAN NICKEL-PLATING CO.,
By J. TRUMBULL SMITH, *President.*

In presence of—
JOSEPH HAYES,
CHARLES H. LEWIS.